United States Patent [19]

Jreij et al.

[11] Patent Number: 5,987,121
[45] Date of Patent: *Nov. 16, 1999

[54] ALLOWING STAND-ALONE AND LOCAL CONTROL OF A SINGLE LED

[75] Inventors: Elie Antoun Jreij; Tave Pearce Dunn, both of Austin, Tex.

[73] Assignee: Siemens Information and Communication Networks, Inc., Boca Raton, Fla.

[ * ] Notice: This patent issued on a continued prosecution application filed under 37 CFR 1.53(d), and is subject to the twenty year patent term provisions of 35 U.S.C. 154(a)(2).

[21] Appl. No.: 08/868,542

[22] Filed: Jun. 3, 1997

Related U.S. Application Data

[63] Continuation of application No. 08/774,002, Dec. 26, 1996, abandoned, which is a continuation of application No. 08/504,090, Jul. 19, 1995, abandoned, which is a continuation of application No. 07/916,287, Jul. 17, 1992, abandoned.

[51] Int. Cl.⁶ ..................................................... H04M 1/00
[52] U.S. Cl. ............................................. 379/396; 379/350
[58] Field of Search ..................................... 379/368, 142, 379/156, 157, 164, 201, 204, 214, 231, 233, 234, 263, 350, 372, 376, 387, 396, 423

[56] References Cited

U.S. PATENT DOCUMENTS

| | | | |
|---|---|---|---|
| 3,743,792 | 7/1973 | Duff et al. | 379/376 |
| 4,503,288 | 3/1985 | Kessler | 379/357 |
| 4,570,035 | 2/1986 | Pinede et al. | 379/165 |
| 4,585,908 | 4/1986 | Smith | 379/354 |
| 4,602,132 | 7/1986 | Nagatomi et al. | 379/165 |
| 4,613,730 | 9/1986 | Fechalos et al. | 379/355 |
| 4,680,785 | 7/1987 | Akiyama et al. | 379/357 |
| 4,873,718 | 10/1989 | Barnett et al. | 379/156 |
| 4,941,171 | 7/1990 | Hasegawa | 379/396 |
| 5,117,454 | 5/1992 | Yamase | 379/396 |
| 5,119,413 | 6/1992 | Okumura et al. | 379/201 |
| 5,153,906 | 10/1992 | Akiyama | 379/357 |
| 5,182,768 | 1/1993 | Nakano et al. | 379/165 |
| 5,220,599 | 6/1993 | Sasano et al. | 379/396 |
| 5,253,940 | 10/1993 | Abecassis | 400/495 |
| 5,309,028 | 5/1994 | Brown et al. | 379/201 |
| 5,311,175 | 5/1994 | Waldman | 341/34 |
| 5,377,261 | 12/1994 | Baals et al. | 379/201 |
| 5,381,468 | 1/1995 | Ozawa | 379/136 |
| 5,402,481 | 3/1995 | Waldman | 379/355 |
| 5,594,778 | 1/1997 | Schaupp, Jr. et al. | 379/58 |

FOREIGN PATENT DOCUMENTS

| | | | |
|---|---|---|---|
| 0236849 | 9/1989 | Japan | 379/376 |

Primary Examiner—Scott Weaver

[57] ABSTRACT

A telephone having key/light control logic which enables independent and dual usage of physical key/light pairs. Firmware within the telephone's key and light control logic is provided access to special tables which have definitions for each key. When a key is depressed, a feature activation code is sent uplink to notify the PBX of the user's action. In response to receipt of the feature activation code, the PBX returns a feature indication. When the telephone receives the feature indication, it scans the tables and turns on all lights for which the feature indication matches the key definition. Within the tables, an extra definition is maintained for the standalone light. This definition is downloaded by the switch at phone initialization time along with the key definitions. If the switch defines a key definition as "local" then the user programs the definition of that key either via the phone keypad or through an application. The independent or dual usage of a light is achieved by using a special case code in the phone firmware when the lights are being lit via feature indications from the switch. If the feature indication matches the key definition for the key reserved, for example, for Mute, then the light is lit only if the key is a locally defined key. In this way, lights for local keys will always match their key definition. Conversely, if the feature indication matches the definition for the standalone light, the light next to the Mute key is lit only if the key is system defined.

10 Claims, 5 Drawing Sheets

ALLOWING STAND-ALONE AND LOCAL CONTROL OF A SINGLE LED

CROSS-REFERENCE TO RELATED APPLICATION

This is a continuation of Ser. No. 08/774,002 filed Dec. 26, 1996, now abandoned, which is a continuation of Ser. No. 08/504,090 filed Jul. 19, 1995 now abandoned, which is a continuation of Ser. No. 07/916,287 filed Jul. 17, 1992 now abandoned.

I. BACKGROUND OF THE INVENTION

A. Field of the Invention

This invention relates to telephone equipment and related application programs;

B. Related Art

A programmable office telephone typically includes a number of keys for performing user definable functions. For example, by way of the telephone keyboard or an applications program running on a connected computer, keys can be selectively programmed to activate such functions as mute, hold, do not disturb or conference call. In many such telephones, each key has an adjacently located light which is automatically turned on when the function for which the key has been defined is activated. For example, a key depression may place the phone in Do Not Disturb mode and the associated, adjacent light will turn on to indicate that fact to the user. Thus, in such telephones, the keys and lights are said to be both physically and logically paired. That is to say, a particular light is only turned on in response to the activation of a feature caused by the depression of the adjacent key.

In some prior art telephones there are lights which are neither adjacent to any key nor associated with any defined key function. For example, in some prior art ROLM telephones, there is a standalone "call waiting" light which is activated directly by way of a command from the PBX rather than in direct response to depression of a corresponding key on the face of the telephone. Similarly, in some prior art telephones there are standalone keys which have no adjacent or associated light. For example, in many telephones there are standalone keys (i.e. keys not having an associated light) dedicated to automatic dialing of prestored telephone numbers.

It is known in the art to provide a telephone with means to maintain the correspondence between a given feature and a physical key/light pair. For example, it is known to provide the firmware within the key and light control logic with access to tables which have definitions for each key. When a key is depressed, a feature activation code (key definition) is sent uplink to notify the switch (e.g. the PBX) of the user's action. In response to receipt of the feature activation code, the PBX returns an LED cadence command (feature indication). When the telephone receives the cadence command for a feature, it scans the tables and turns on all lights for which the feature indication matches the key definition.

While the use of physical/logical pairing for some functions and standalone keys and/or lights for other functions can be useful, such configurations can crowd the face of the telephone and add to the expense of manufacture. Thus, there is a need for a more flexible manner of providing activation and indication of standalone functions.

II. SUMMARY OF THE INVENTION

In light of the above, there is provided a telephone, including: a plurality of keys; a plurality of lights, one each adjacent to each of the keys; and, means for selectively performing logical coupling and decoupling of a first function activated by depression of at least one of said keys and a second function the activation of which is indicated by an adjacent one of the lights.

According to an embodiment of the present invention, an extra "key definition" entry in the key definition tables is maintained for the standalone light. This definition is downloaded by the PBX at phone initialization time along with the rest of the key definitions. If the PBX defines a key definition as "local" then the user programs the definition of that key either via the phone keypad or through an application (the switch only knows that the key is defined at the phone). In this case, the user expects all key and light definitions to be paired, including the special key/light pair reserved for separate functions when controlled by the switch.

Advantageously, the present invention enables the telephone to have independent usage of a key and its physically associated light. Further, the present invention enables a key and a light to be logically paired for one usage and logically decoupled for another. For example, a light blinking at one rate can be used to indicate "call waiting", while the same light blinking at another rate (or under other circumstances) can be used to indicate that a key initiated feature has been activated.

The independent or dual usage of a light is achieved by using a special case code in the phone firmware when the lights are being lit via feature indications from the switch. If the feature indication matches the key definition for the key reserved, for example, for mute, then the light is lit only if the key is a locally defined key. In this way, lights for local keys will always match their key definition. Conversely, if the feature indication matches the definition for the standalone light, the light next to the mute key is lit only if the key is system defined.

III. BRIEF DESCRIPTION OF THE DRAWINGS

The present invention will be better understood by reference to the drawing, wherein.

Like reference numerals appearing in more than one figure represent like elements.

IV. DETAILED DESCRIPTION OF THE PREFERRED EMBODIMENT

Figure 1:
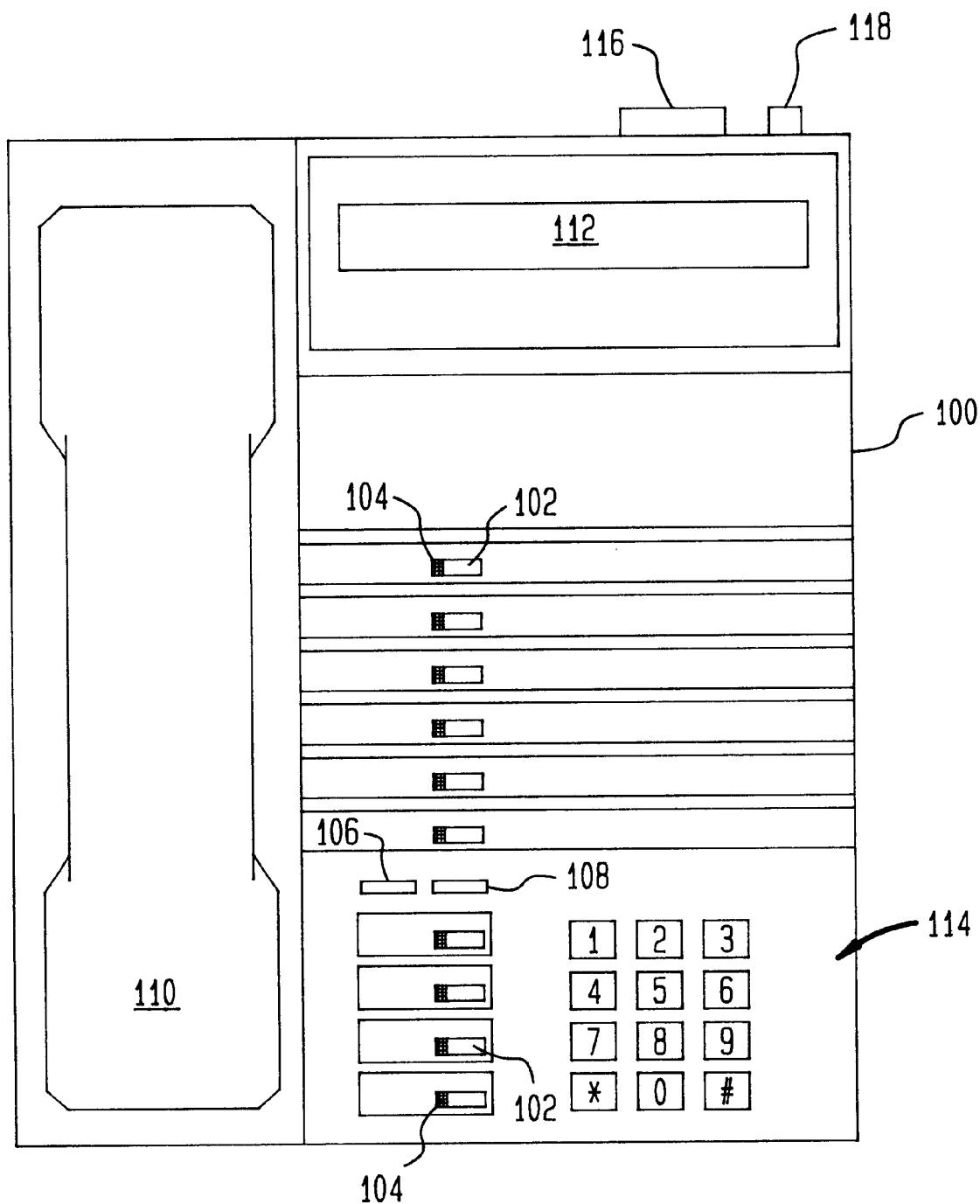
FIG. 1 is an illustration of a telephone of a type suitable for an embodiment of the present invention.

Turning first to FIG. 1, a telephone 100, of a type suitable for use in conjunction with the present invention, is illustrated. The telephone of FIG. 1 includes a plurality of keys 102. For each of the keys 102 there is a corresponding adjacently located light in the form of a light emitting diode (LED) 104. The phone of FIG. 1 is also provided with volume control keys 106, 108 (which have no corresponding LEDs), a handset 110, a liquid crystal display 112, and a telephone keypad 114. A computer communications port 116 and a telephone network port 118 (for connection to a branch exchange system) are provided at the rear of the telephone.

Figure 2:
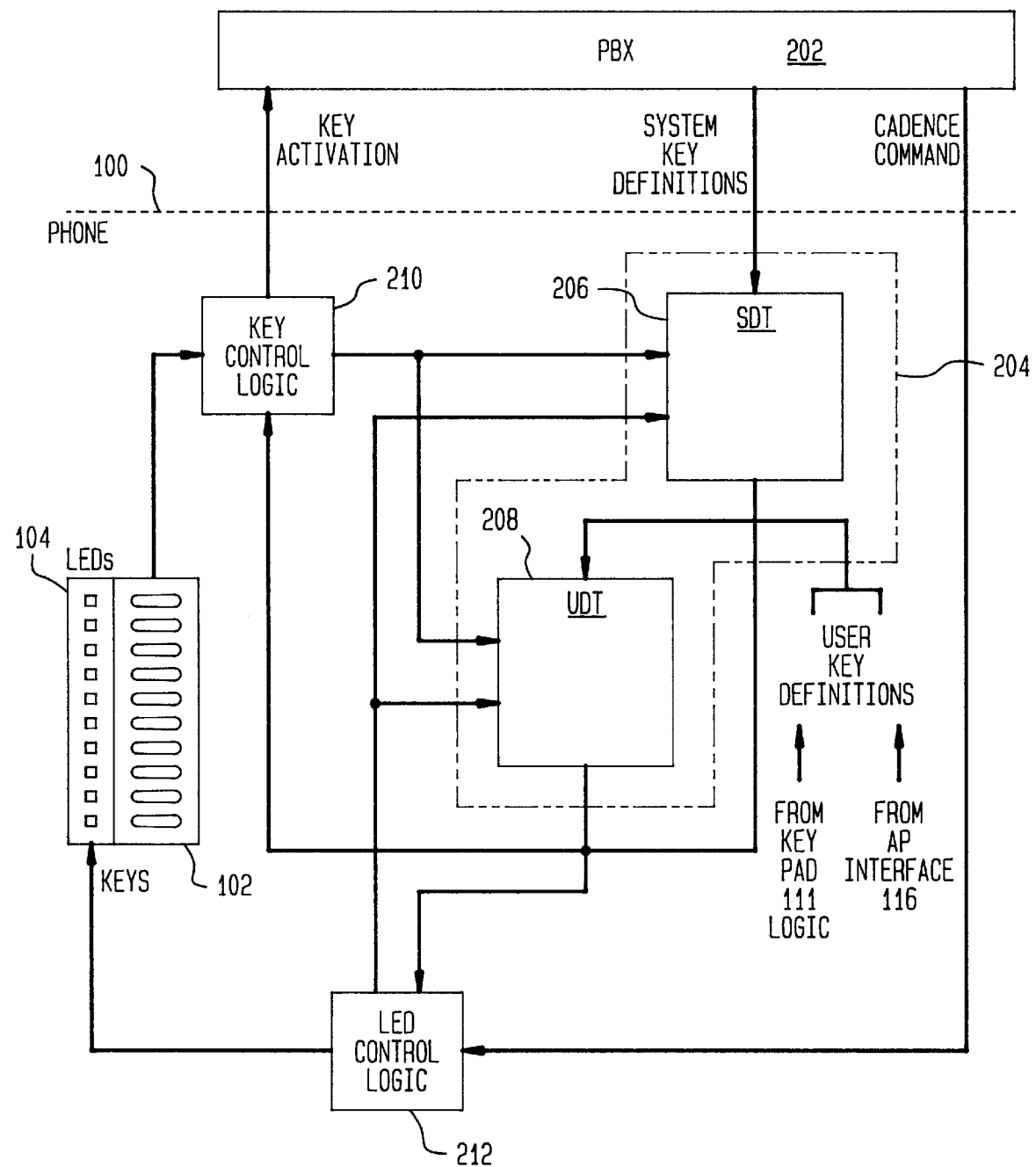
FIG. 2 is a diagram showing key/light definition and control logic according to a first embodiment of the present invention.

The telephone of FIG. 1 can be advantageously combined with key/light definition and control logic according to an embodiment of the present invention as illustrated in FIG. 2. The telephone of FIG. 2 is used in conjunction with a conventional PBX 202 such as a ROLM computerized branch exchange (CBX). The key/light definition and control logic includes a read/write random access memory (RAM) 204, within which is defined system key definition table (SDT) 206 and a user key definition table (UDT) 208. The SDT 206 is connected to receive key definition data from the PBX 202 via the telephone network communications port. The UDT 208 is coupled to both the telephone keypad logic and to the computer communications port so as to be programmable either directly from the keypad or from an application program executing on a connected computer.

The memory 204 preferably includes a non-volatile portion and a volatile portion. The non-volatile portion can be embodied as an electrically erasable memory, such as a EEPROM. The volatile portion can be embodied as a conventional Dynamic or Static RAM. The UDT 208 is preferably stored in the non-volatile portion of the memory 204 to protect against power interruptions. The SDT 206 is stored in the volatile portion of the memory 204 and is reloaded from the PBX in the advent of a power outage. Alternatively, the SDT could also be stored in the non-volatile memory.

The telephone of FIG. 2 also includes key control logic (KCL) 210 and LED control logic (LCL) 212. The KCL 210 is connected to the keys 102, the PBX 202, the SDT 206 and the UDT 208. The LCL 212 is connected to the LEDs 104, the PBX 202 (via the telephone communications port), the SDT 206 and the UDT 208.

The KCL 210 includes conventional logic to identify the key number of a specific key that has been depressed. When a key is depressed the KCL 210 scans the SDT 206 and the UDT 208 to determine the feature definition which has been programmed for the depressed key and sends a feature activation code to the PBX 202 by way of the telephone network communications port.

The LCL 212 is connected to receive a cadence command from the PBX 202. The cadence command includes a feature code and LED cadence data (such as blink rate). The LCL 212 uses the feature code to scan the SDT 206 and the UDT 208, which return the appropriate LED number or numbers corresponding to the feature. When the LED numbers have been received from the SDT/UDT 206,208 the LCL 212 lights the LED so identified in accordance with the cadence data received from the PBX 202.

Figure 3:
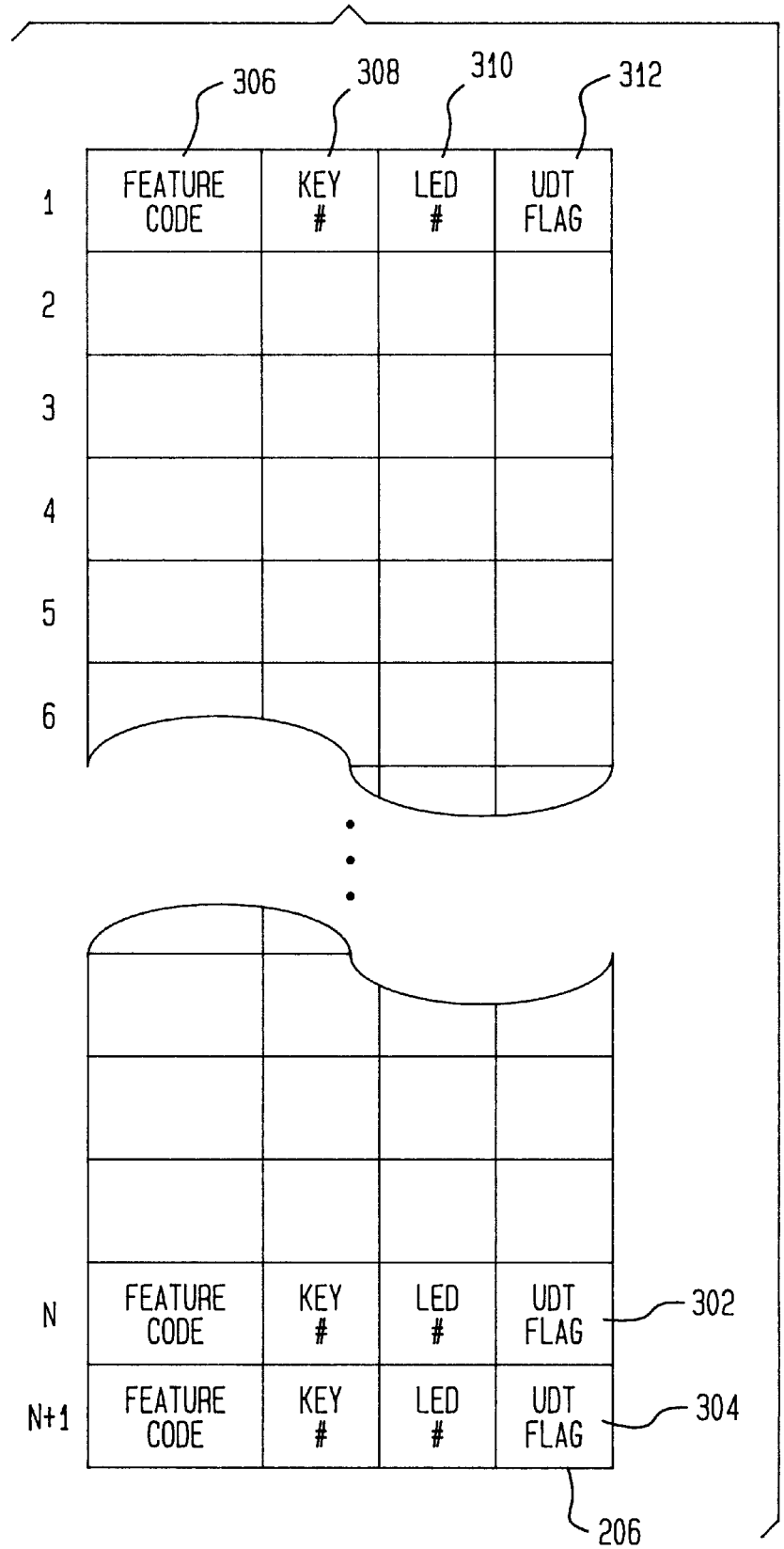
FIG. 3 is an illustration of the System Definition Table of FIG. 2.

A more detailed illustration of the SDT is shown in FIG. 3. As illustrated in FIG. 3, the SDT is a table (formed in random access memory) which includes one entry for each key/LED pair on the telephone. According to an embodiment of the present invention, one of the SDT entries 302 is dedicated to the standalone key and an additional entry 304 is provided for the standalone LED. It should be understood that the standalone key and the standalone LED can be physically paired on the telephone (i.e. physically laid out such that the standalone LED is adjacent to the standalone key). Thus, in a telephone with 10 key/LED pairs, the table of FIG. 3 would include 11 entries.

Each entry in the SDT 206 (including that for the standalone key and the standalone LED) includes a feature code 306, a key number 308, an LED number 310, and a UDT flag 312. When the UDT flag is set to a "1" the key/LED logic will look to the UDT for the key and LED definitions. The UDT 208 is structured identically to the SDT 206 with the exception that the UDT entries do not include the UDT flag field.

The KCL 210 determines the proper key definition from the UDT/SDT as follows: When the KCL 210 receives a key definition code from the PBX 202 it looks in the SDT for a matching system key definition. The entry having the matching key definition will either indicate (via the UDT flag) that the key is locally defined or contains the actual system definition. If the UDT flag indicates that the key is system defined (flag=0), the KCL accesses the key/LED definition fields (as appropriate) from the SDT. If the UDT flag indicates that the key is locally defined (flag=1), the KCL accesses the key definition field from the UDT 208.

Figure 4:
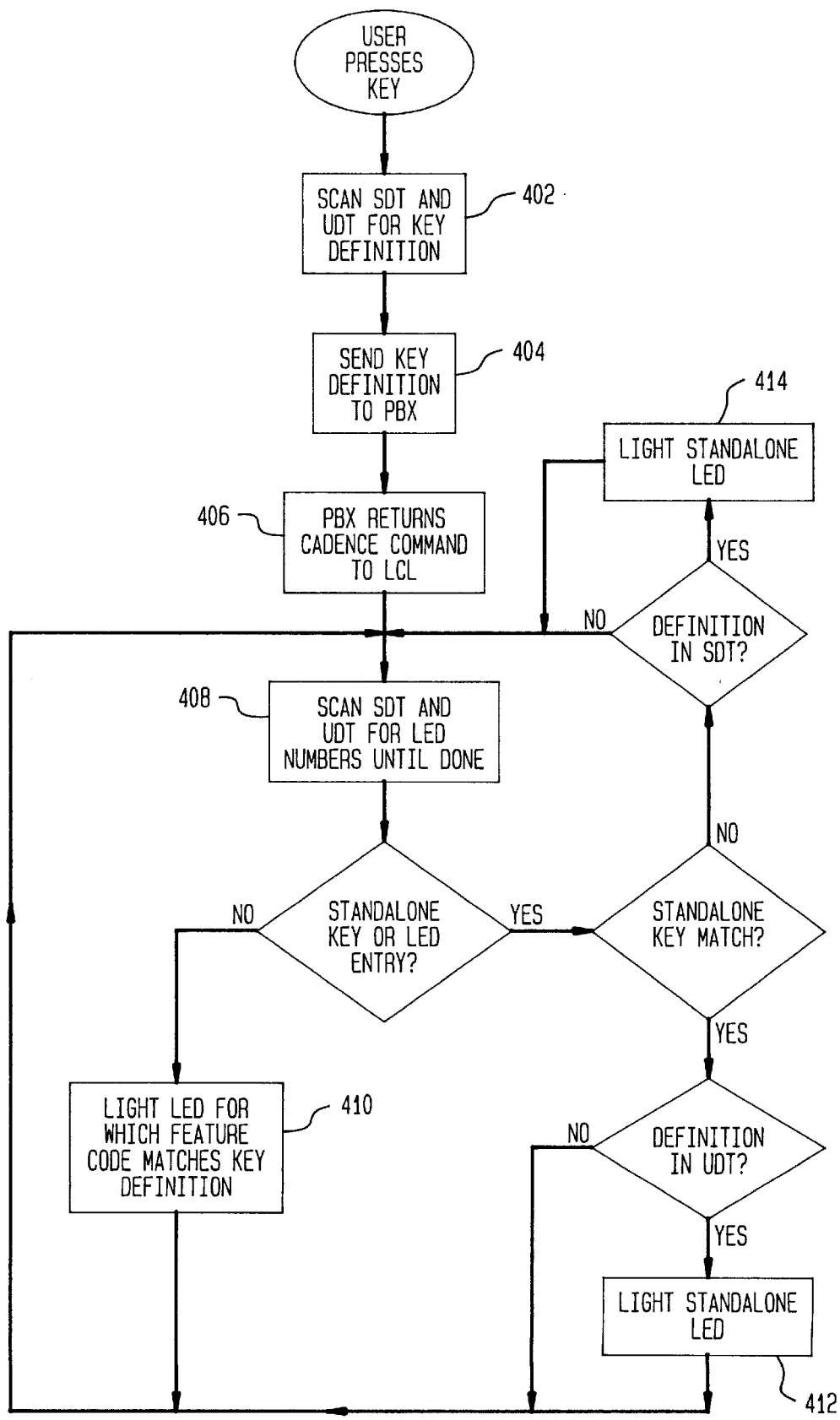
FIG. 4 is a flow chart of the operation of the embodiment of FIG. 2.

The operation of the logic of FIG. 2, according to an embodiment of the present invention will be better understood by reference to the flow chart of FIG. 4. The process begins when a user presses a key. In response, in step 402, the KCL scans the SDT 210 and the UDT (as described above) to determine the key definition. Next, in step 404, the KCL sends the key definition to the PBX. In step 406 the PBX returns a cadence command which includes a feature code (feature name) and LED cadence data (such as blink rate). The cadence command is routed to the LCL, which, in step 408, scans the SDT and the UDT (using the same rules as the KCL) to determine which LED definitions match the feature code sent by the PBX. It should be understood that more than one LED definition may match the feature and thus more than one LED may be lit in response thereto. Specifically, the LCL lights the LEDs according to the following rules:

(a) Except for the standalone key entry and the standalone LED entry definitions, the LCL (by way of step 410) lights all LEDs for which the feature code matches the key definition in either the SDT or the UDT. The standalone key/LED definitions are handled under rules (b) and (c).

(b) If the standalone key definition matches the feature code and is locally defined (is found in the UDT), in step 412 the LCL lights the standalone LED.

(c) If the standalone LED definition matches the feature code and the standalone key is system defined (is found in the SDT) in step 414 the LCL lights the standalone LED.

Figure 5:
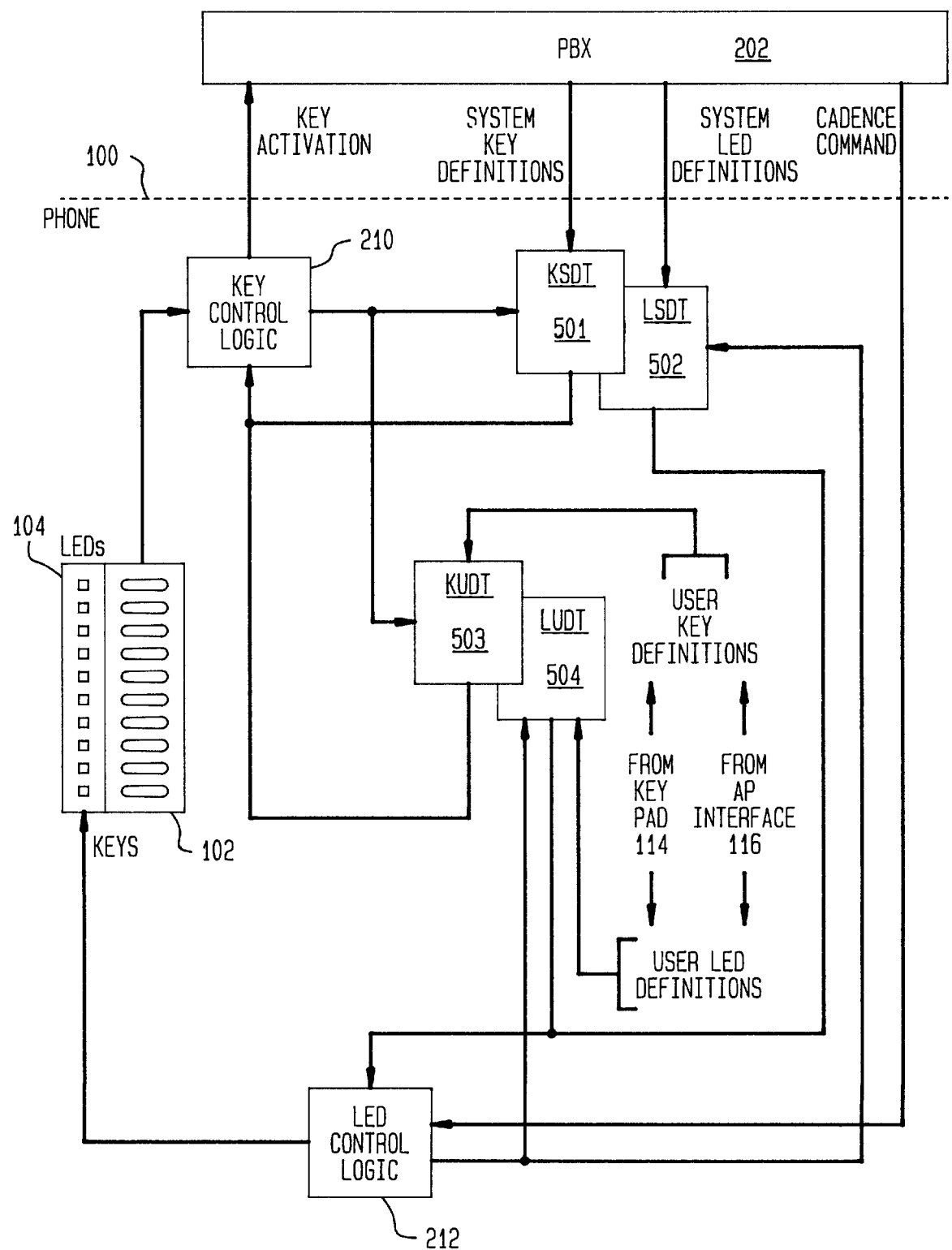
FIG. 5 is a diagram showing key/light definition and control logic according to a second embodiment of the present invention.

An alternative embodiment of the present invention is illustrated in FIG. 5. In this embodiment, both the SDT and UDT have separate tables for all keys and LEDs on the telephone. In this way the key and LED that are seen on the telephone face as a pair, each have separate definitions (the key definition found in the SDT key or UDT key table and the LED definition found in the SDT LED or UDT LED table). Since all keys and LEDs on the phone have separate definitions, the keys and LEDs on the telephone can be completely utilized.

Consider a user that has several autodial keys on his telephone. Since autodial keys do not use the associated LEDs, these LEDs are "wasted". Since, according to the principles of the present invention, the PBX can define these keys and LEDs separately, then the user can continue to use the keys for autodialing, but can also use those LEDs for other LED only features such as a voice mail indication light. Note that the PBX can use the key and LED pairs in the traditional manner by defining both the key and its associated LED to the same feature.

It should be understood that, in addition, the PBX can continue to designate that a key is locally defined, indicating that feature its definition lies in the user tables. It can also separately indicate that the LED is locally defined. In this fashion, the switch can control a key and allow the user to control the LED and vice versa. If the PBX wants the user to have total control over both the key and LED, then it marks both the key and LED as locally defined.

According to the embodiment of FIG. 5, a first table 501 (the KSDT) is provided for system key definitions and a second table 502 (the LSDT) is provided for system LED definitions. Local definitions also have an entire table 503 for keys and an entire table 504 for LEDs. Assuming that the PBX gives control of both the key and LED to the user, the user can determine whether the physical key/LED pair will function as a logical pair or act separately.

An application can control the telephone keys and LEDs by using commands from a conventional command set for telephony (e.g. the ROLM command set). For example, if the user's application needs to define the key normally used for "Call Waiting" and control its LED, the application would first verify (by reading the SDT 206) that the PBX has designated that key to be locally definable rather than system defined. Next, the application could use the ROLM "RD" (Repdial Definition) command to define that key to "Mute" (code number 36).

In response to the user pressing the key which is now defined as Mute, the PBX would send the phone the feature indication for "Mute". The phone will note that the key is locally defined, and so will let the definition of the key (the "Mute" definition) drive the key. Therefore, the "Mute" LED will light.

An alternative method of locally controlling that LED is to provide the key definition via a series of keystrokes on the keys of the phone, rather than using an application program.

Now that the invention has been described by way of the preferred embodiment, various enhancements and improvements which do not depart from the scope and spirit of the invention will become apparent to those of skill in the art. Thus it should be understood that the preferred embodiment has been provided by way of example and not by way of limitation. The scope of the invention is defined by the appended claims.

We claim:

1. A method of selecting functions in a telephone, said method comprising the steps of:

a) defining a set of keys, said set including plural keys;

b) defining at least two key assignments, each assignment giving each key a function and each key having at least two key assignments, a first one of said at least two key assignments being to a branch-exchange-defined function and a second one of said at least two key assignments being to a user-defined function; and c) for any key in said set, selecting between any of said assignments using a only standalone key.

2. The method of claim 1, wherein the assignment selected is indicated by lighting a light.

3. The method of claim 2, wherein lighting said light indicates selection of branch-exchange-defined functions.

4. The method of claim 2, wherein lighting said light indicates selection of user-defined functions.

5. The method of claim 1, wherein each of said assignments is stored in memory and a processor is used to select among said assignments.

6. A telephone system including:

a) a set of keys, said set including plural keys, each key having at least two key assignments, each assignment giving each key a function, a first one of said at least two key assignments being to a branch-exchange-defined function and a second of said at least two key assignments being to a user-defined function; and b) a standalone key that can be used alone to select any of said assignments for any key in said set.

7. The telephone of claim 6, further including a light, wherein the assignment selected is indicated by lighting said light.

8. The telephone of claim 7, said light when lit indicates selection of branch-exchange-defined functions.

9. The telephone of claim 7, wherein said light when lit indicates selection of user-defined functions.

10. The telephone of claim 7 further comprising a memory and a processor, wherein each of said assignments is stored in said memory and said processor is used to select among said assignments.

* * * * *